(12) United States Patent
Garios

(10) Patent No.: US 9,266,469 B2
(45) Date of Patent: Feb. 23, 2016

(54) SOUND MEASURING AND REGULATING DEVICE FOR A HORN

(76) Inventor: Wadih Antonio Garios, Juiz De Fora (BR)

(*) Notice: Subject to any disclaimer, the term of this patent is extended or adjusted under 35 U.S.C. 154(b) by 0 days.

(21) Appl. No.: 13/881,718

(22) PCT Filed: Nov. 1, 2011

(86) PCT No.: PCT/BR2011/000408
§ 371 (c)(1),
(2), (4) Date: Apr. 25, 2013

(87) PCT Pub. No.: WO2012/058741
PCT Pub. Date: May 10, 2012

(65) Prior Publication Data
US 2013/0214916 A1    Aug. 22, 2013

(30) Foreign Application Priority Data
Nov. 4, 2010   (BR) ..................................... 1004679

(51) Int. Cl.
| | |
|---|---|
| *B60Q 1/00* | (2006.01) |
| *B60Q 5/00* | (2006.01) |
| *G08B 3/10* | (2006.01) |
| *B06B 1/02* | (2006.01) |
| *B60R 16/02* | (2006.01) |

(52) U.S. Cl.
CPC .............. *B60Q 5/001* (2013.01); *B06B 1/0215* (2013.01); *B60Q 5/00* (2013.01); *B60R 16/02* (2013.01); *G08B 3/10* (2013.01)

(58) Field of Classification Search
CPC ........... B06B 1/0215; G08B 3/10; B60Q 5/00
USPC ......... 340/425.5, 384.1, 384.5, 384.7, 384.71
See application file for complete search history.

(56) References Cited

U.S. PATENT DOCUMENTS

| | | | | |
|---|---|---|---|---|
| 5,420,563 | A * | 5/1995 | Frigo ......................... | 340/388.1 |
| 6,130,605 | A * | 10/2000 | Flick ......................... | 340/384.1 |

(Continued)

FOREIGN PATENT DOCUMENTS

| | | |
|---|---|---|
| BR | 0504597 | 6/2007 |
| EP | 0657869 A1 | 6/1995 |
| JP | 11165586 A | 6/1999 |

OTHER PUBLICATIONS

International Search report malted Dec. 18, 2011 for PCT/BR2011/000408.

(Continued)

*Primary Examiner* — John A Tweel, Jr.
(74) *Attorney, Agent, or Firm* — Nevrivy Patent Law Group P.L.L.C.

(57) ABSTRACT

A sound measuring and regulating device for a horn comprises a push button panel (1) or a remote control (10) with push button switches, whereby activating one of the switches sends a signal to be evaluated by a main control module (2) that is connected to a relay (4), which activates an automotive horn (5), processing a specific, pre-programmed sound for that contact. Each push button corresponds to a programmed sound, fulfilling the expectations of the user. The aim of the present invention is to regulate and dispense these sounds, thereby creating a healthier environment for all without interfering with the original setup of the steering wheel's panel (3) which continues to activate the factory's original horn.

11 Claims, 1 Drawing Sheet

(56) References Cited

U.S. PATENT DOCUMENTS

Figure 1:
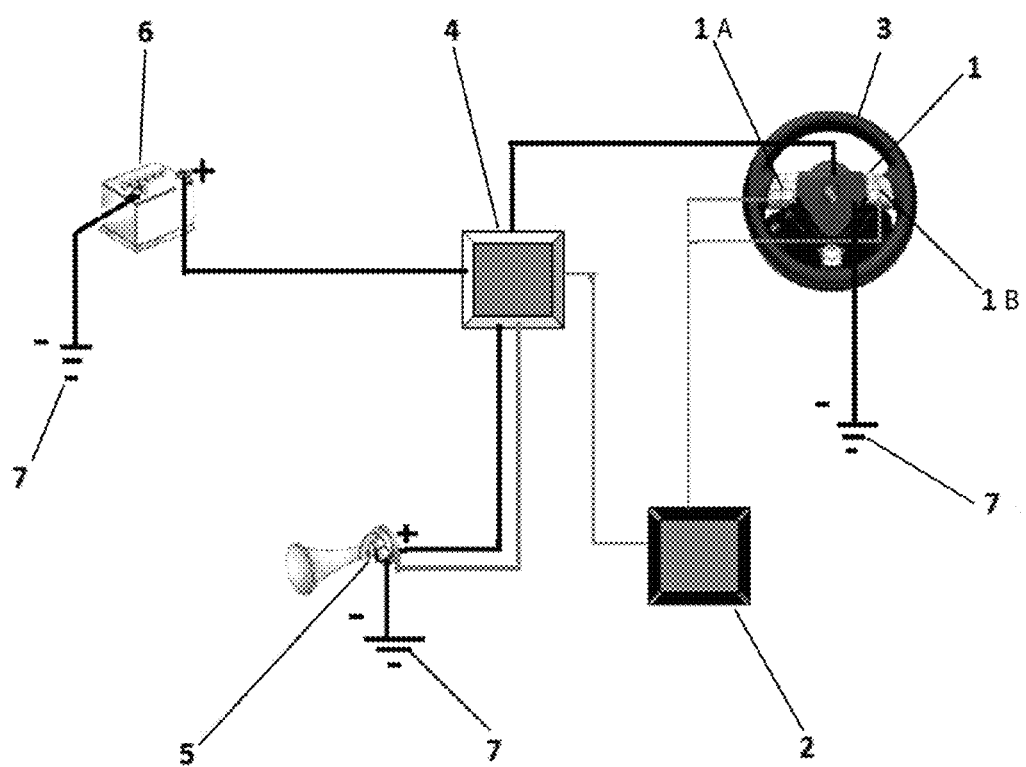

| | | | |
|---|---|---|---|
| 6,418,362 B1 * | 7/2002 | St. Pierre et al. | 701/36 |
| 6,489,885 B2 * | 12/2002 | Solow | 340/384.7 |
| 6,788,188 B2 * | 9/2004 | Sague | 340/384.72 |
| 6,816,065 B2 * | 11/2004 | Viero | 340/384.1 |
| 2003/0228021 A1 * | 12/2003 | Letinturier et al. | 381/340 |
| 2008/0114904 A1 * | 5/2008 | Kosco | 710/13 |
| 2012/0235835 A1 * | 9/2012 | Jahn | 340/989 |

OTHER PUBLICATIONS

International Search report mailed Dec. 16, 2011 for PCT/BR2011/000408 (English Translation).

* cited by examiner

SOUND MEASURING AND REGULATING DEVICE FOR A HORN

The following patent specification refers to a transport vehicle's horn regulating and dispensing device that sends an acoustic signal, which thanks to its special design and performance features, advantageously stands out in an efficient and practical way.

Acoustic sounds are emitted by vehicles, by applying pressure on a switch, or a horn pad, which activates the horn and emits sound.

Because horn switches are difficult to manage in some vehicles, their handling becomes complicated, often leading to sounds that are undesired by the user which do not always reflect the driver's intended message, thus creating embarrassing situations, conflicts between people involved, and even excessive noise pollution, which may cause even more problems for humans.

One of these problems occurs when the user needs to alert pedestrians to the presence of his vehicle in a disputed area; an area common to both pedestrians and vehicle operator, such as the exit for a parking area or the entrance to a gas station, etc. In certain situations involving public road crossings, people, from teens to adults, cross in front of cars at a very close distance, making it necessary for the driver to alert the pedestrian by use of the horn. Instead of emitting a low and short sound, desired by the driver, the horn emits a strident sound, which frightens everyone. Due to its basic operating mechanism and limited controllability, the horn emits a shrill sound, causing negative reactions to people's health, as well as negative social interactions. This and many other situations are routine and cause a diversity of uncalculated harm to all who co-exist with vehicles.

With the goal of achieving a solution to these problems, and aiming to overcome them, the "Sound Measuring & Regulating Device for a Horn" was created, object of the present invention, which seeks to provide a solution; being that this system regulates and dispenses the sound emitted by the horn as it is activated by the user. The driver and pedestrian are thus provided with security and comfort, since, when it is used, the acoustic sound it emits is according to its programmable design.

The present invention is characterized by the fact that it provides efficiency in regulating and dispensing the sound produced by the car's horn, without changing its normal function, and also provides a low cost of production and installation while being easy to operate and maintain, since the car's original horn continues to be used to activate sound according to its original design.

The purpose of the "Sound Regulating and Measuring Device for a Horn," object of the present invention, may be better understood by the following detailed description, in accordance with the attached figures.

Figure 2:
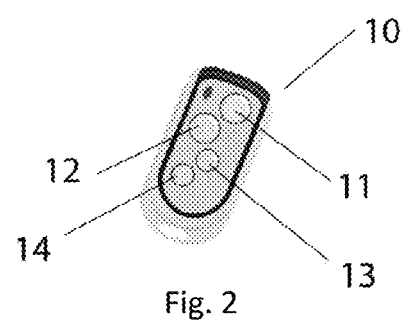

FIGS. 1 and 2 show an overview of the parts, with respective indications, which constitute the present invention.

The embodiments of the present invention are shown in FIGS. 1 and 2, and are described herewith in more detail.

FIG. 1 shows an embodiment of the "Sound Regulating and Measuring Device for a Horn" comprising a push button panel (1), preferably set in the steering wheel (3) or in a position desired by the user.

The push button panel is provided with embossed push buttons so as to allow the user to identify them by touch, and to activate the correct push button needed for the occasion. When activating any of the push buttons, a signal is sent by wired signal to the main control module (2) which interprets the signal, activates a relay (4), and actuates a horn (5) by processing a specific sound pre-programmed for that contact. Each push button (1A, 1B) corresponds to a specific sound, and fulfils the user's expectations, allowing the user to better evaluate the situation and emit an appropriate acoustic signal without causing any extra discomfort to pedestrians.

The horn's original mechanism continues to be the same, i.e., the structure on the steering wheel (3) comprising a switch for the horn (5) that is connected to the relay (4) which activates the horn (5) by means of the power provided by a battery (6), thereby emitting an acoustic signal.

FIG. 2 depicts a remote control (10) containing a second embodiment of the invention.

To choose the desired sound for each button, the switches must each be programmed on the remote control according to each situation. For example: a push button (11) may be programmed for a very short distance, so the sound emitted by the horn is very low and short, and if the finger is kept on the push button for some time, it repeats the same acoustic signal within a programmed time period. To illustrate this example with numbers, a sound is assumed of 0.4 to 0.6 seconds in duration, whereby, if the push button is maintained pressed, it would repeat every 1.5 seconds. These intervals will be set according to the user and his horn's system. In another example for the remote control (10) the push button (12), is programmed by the user to cause the horn to emit two consecutive short sounds (each with a duration of approximately 0.6 seconds), with a short period of silence between the signals (approximately 0.8 secs) during which, if the push button (12) were pressed again, both of the short sounds would be repeated in a space of, for example, 1.0 to 1.5 seconds. This operation could be similarly programmed for each of the other push buttons (13, 14). Each adjustment must be appropriate for the specific type of sound. In the case of a command requiring three or more push buttons, the first command could correspond to a warning for short distances, the second for slightly farther distances, and so forth, according to the user's needs, always seeking to regulate and dispense the sounds appropriately to create an atmosphere which is healthier for everyone.

The remote control (10) connects the main control module (2) by a radiofrequency signal, and the main control module (2) is connected to the relay (4), which activates the horn (5). When the horn (5) is activated in the traditional way, the remote control (10) is interrupted without interfering with the original design function of the vehicle.

The invention claimed is:

1. A sound regulating device for a horn of an automotive vehicle, said sound regulating device being meant for controlling the duration and the level of the volume of the sound emitted by the original horn of the vehicle and comprising a push-button panel provided with push buttons, a main control module, said push-button panel being connected to the main control module which is connected to a relay of the horn, wherein, when a user presses a push button of said push-button panel, a control signal is sent to said main control module, which interprets the signal and emits a pre-programmed signal to the main control module thereby making the original horn of the vehicle to emit a sound signal having pre-programmed levels of volume and duration which are different from the regular sound signal of said original automotive horn.

2. The sound regulating device of claim 1, wherein each of said push buttons are programmed to cause the push-button panel to emit a specific pre-programmed signal to the main control module, said signal being different from the pre-programmed signals of the other push buttons.

3. The sound regulating device of claim 2, wherein said push-button panel is assembled in a steering wheel of said automotive vehicle.

4. The sound regulating device of claim 1, wherein each of said push buttons are embossed to allow the user to identify it by touch.

5. The sound regulating device of claim 4, wherein said push-button panel is assembled in a steering wheel of said automotive vehicle.

6. The sound regulating device of claim 2, wherein each of said push buttons are embossed to allow the user to identify it by touch.

7. The sound regulating device of claim 6, wherein said push-button panel is assembled in a steering wheel of said automotive vehicle.

8. A sound regulating device for a horn of an automotive vehicle, said sound regulating device being meant for controlling the duration and the level of the volume of the sound emitted by the original horn of the vehicle and comprising a remote control provided with push buttons and a main control module, the remote control being able to connect by means of radiofrequency signals to the main control module which is connected to a relay of the horn, wherein, when a user presses a push button of said remote control, a control signal is sent to said main control module, which interprets the signal and emits a pre-programmed signal to the main control module thereby making the original horn of the vehicle to emit a sound signal having pre-programmed levels of volume and duration which are different from the regular sound signal of said original automotive horn.

9. The sound regulating device of claim 8, wherein each of said push buttons are programmed to cause the remote control to emit a specific pre-programmed signal to the main control module, said signal being different from the pre-programmed signals of the other push buttons.

10. The sound regulating device of claim 8, wherein each of said push buttons are embossed to allow the user to identify it by touch.

11. The sound regulating device of claim 9, wherein each of said push buttons are embossed to allow the user to identify it by touch.

* * * * *